United States Patent
Gonzenbach et al.

(10) Patent No.: US 11,578,007 B2
(45) Date of Patent: Feb. 14, 2023

(54) CATALYTICALLY ACTIVE FOAM FORMATION POWDER

(71) Applicant: DE CAVIS AG, Dübendorf (CH)

(72) Inventors: Urs T. Gonzenbach, Buchs (CH); Philip Noah Sturzenegger, Greifensee (CH)

(73) Assignee: DE CAVIS AG

( * ) Notice: Subject to any disclaimer, the term of this patent is extended or adjusted under 35 U.S.C. 154(b) by 237 days.

(21) Appl. No.: 15/757,859

(22) PCT Filed: Aug. 30, 2016

(86) PCT No.: PCT/CH2016/000112
§ 371 (c)(1),
(2) Date: Mar. 6, 2018

(87) PCT Pub. No.: WO2017/041189
PCT Pub. Date: Mar. 16, 2017

(65) Prior Publication Data
US 2018/0354864 A1 Dec. 13, 2018

(30) Foreign Application Priority Data
Sep. 7, 2015 (EP) ................. 15002618

(51) Int. Cl.
| C04B 40/00 | (2006.01) |
| C04B 38/02 | (2006.01) |
| C04B 111/28 | (2006.01) |
| C04B 111/52 | (2006.01) |
| C04B 7/02 | (2006.01) |
| C04B 7/32 | (2006.01) |

(52) U.S. Cl.
CPC .......... C04B 40/0042 (2013.01); C04B 38/02 (2013.01); *C04B 7/02* (2013.01); *C04B 7/32* (2013.01); *C04B 2111/28* (2013.01); *C04B 2111/52* (2013.01); *C04B 2235/3268* (2013.01); *C04B 2235/3272* (2013.01); *C04B 2235/3418* (2013.01); *C04B 2235/3427* (2013.01); *C04B 2235/442* (2013.01); *C04B 2235/447* (2013.01); *Y02W 30/91* (2015.05)

(58) Field of Classification Search
None
See application file for complete search history.

(56) References Cited

U.S. PATENT DOCUMENTS

| 3,565,647 A | 2/1971 | Magder | |
| 4,535,003 A * | 8/1985 | Ogawa | C08J 7/126 106/272 |
| 5,605,570 A | 2/1997 | Bean et al. | |
| 5,977,002 A * | 11/1999 | Boulos | C03C 3/087 501/71 |
| 6,171,532 B1 | 1/2001 | Sterzel | |
| 6,194,051 B1 * | 2/2001 | Gagas | B29C 44/1266 428/99 |
| 6,277,190 B1 * | 8/2001 | Schulte | C04B 20/1022 106/719 |
| 6,342,100 B1 * | 1/2002 | Nover | B82Y 30/00 106/464 |
| 6,478,868 B1 * | 11/2002 | Reddy | C09K 8/46 507/140 |
| 6,547,871 B2 * | 4/2003 | Chatterji | C04B 24/14 106/672 |
| 6,686,044 B2 * | 2/2004 | Nakai | C08K 9/04 427/212 |
| 6,951,249 B1 * | 10/2005 | Chatterji | C04B 24/16 106/677 |
| 7,410,536 B2 | 8/2008 | Friedrich et al. | |
| 8,741,995 B2 * | 6/2014 | Fujiwara | C08K 9/04 524/301 |
| 10,072,160 B1 * | 9/2018 | Nowak | C08G 65/007 |
| 2002/0050231 A1 | 5/2002 | Brothers et al. | |
| 2003/0110986 A1 | 6/2003 | Reddy et al. | |
| 2006/0020056 A1 * | 1/2006 | Dombrowski | C08K 9/08 523/210 |
| 2010/0133195 A1 * | 6/2010 | Gane | B01J 20/043 210/667 |
| 2010/0310846 A1 * | 12/2010 | Berke | C04B 28/04 427/427 |
| 2015/0083958 A1 * | 3/2015 | Bernardi | C04B 28/04 252/62 |

FOREIGN PATENT DOCUMENTS

| DE | 2525611 A1 | 3/1977 |
| EP | 2045227 A1 | 4/2009 |
| WO | 9210440 A1 | 6/1992 |
| WO | 2007068127 A1 | 6/2007 |
| WO | 2011101386 A1 | 8/2011 |
| WO | 2013034567 A2 | 3/2013 |
| WO | 2013121143 A1 | 8/2013 |
| WO | 2014009299 A2 | 1/2014 |

OTHER PUBLICATIONS

Demirbas, Biodiesel—a realistic fuel alternative for diesel enginers, p. 81 (Year: 2009).*

(Continued)

*Primary Examiner* — Stefanie J Cohen
(74) *Attorney, Agent, or Firm* — Luedeka Neely Group, PC (57) ABSTRACT

The present invention relates to the field of foam formation and stabilization, particularly foamed construction materials, such as cement. Disclosed are additives suitable to obtain mineral foams when added to the corresponding starting materials. The invention provides a ready-to-use product in the form of a solid particulate composition comprising hydrophobized particles (1) and catalytically active particles (2) as defined in claim 1. The invention further provides for manufacturing methods of such ready-to-use product.

7 Claims, 2 Drawing Sheets

(56) References Cited

OTHER PUBLICATIONS

Davidovits, Joseph, Geopolymer Cement: A review, Geopolymer Institute, Jan. 2013.
Duxson, P., et al., Geopolymer technology: the current state of the art, Advances in Geopolymer Science & Technology, J. Mater Sci, 2007, vol. 42, pp. 2917-2933.
Holmberg, Krister, et al., Adsorption of Surfactants at Solid Surfaces, Surfactants and Polymers in Aqueous Solution, 2002, pp. 357-387.
Juillerat, Franziska Krauss, et al., Microstructural Control of Self-Setting Particle-Stabilized Ceramic Foams, J. Am. Ceram. Soc., 2011, vol. 94, pp. 77-83.
International Search Report and Written Opinion for PCT/CH2016/000112, dated Mar. 13, 2017, 13 pages.

* cited by examiner

CATALYTICALLY ACTIVE FOAM FORMATION POWDER

This application is a Section 371 national phase entry of PCT application PCT/CH2016/000112, filed Aug. 30, 2016. This application also claims the benefit of the earlier filing date of European patent application 15002618.5, filed Sep. 7, 2015.

The present invention relates to the field of foam formation and stabilization, particularly foamed construction materials, such as cement. The invention provides a ready-to-use product in the form of a solid particulate composition to obtain such construction materials. The invention further provides for manufacturing methods of such ready-to-use products and of such construction materials.

There is a growing need for mineral foams with high porosities in the classical and high-tech industry as well as in the construction business. Mineral foams combine unique properties like low specific weight, thermal, electrical, acoustic insulation, they can exhibit high specific strength and depending on the chemical composition extraordinary thermal and chemical stability. In addition, foam formation is an efficient strategy to save raw materials and reduce the weight of components. Examples for applications in the high-temperature area are the insulation of furnaces used in the steel and glass production. Foamed concrete needs much less cement in comparison with dense parts, helps to reduce weight or improves the insulating properties of construction parts. Apart from the material chemistry, the properties of mineral foams are governed by the microstructure and especially the size, morphology and distribution of the pores. Depending on the application the pores may be in the millimeter range or in the order of magnitude of hundreds of microns. For thermal insulation applications a mainly closed pore structure is preferred, whereas for acoustic insulation the formation of pore openings is beneficial. Independent of how a microstructure needs to be designed for a certain application, important is that a foamed product exhibits no random gradients and be homogeneous throughout the whole volume. Therefore, it is absolutely necessary to control the foam microstructure from the time of foam formation until the end of the fabrication process. Because a foam is a thermodynamically instable system and subject to degradation from the moment of its formation, there is a need for foam formation and stabilization technologies that enable to effectively control the microstructure of mineral foams.

Several attempts were already undertaken to produce foams with more than 60 vol % porosity from various minerals. However, a simple to implement and robust technology that allows for a deliberate control over foam microstructure is still to be developed. It was further realized that known technology to stabilize foams can lead to significant retardation of setting and/or result in a decrease of mechanical properties. This is considered disadvantageous.

Blum et al. (EP2045227A1) describe foam formation by blowing a surfactant containing slurry of a mineral mix comprising rapid-setting cement by means of hydrogen peroxide decomposition. No ready-to-use foaming powders are added according to Blum et al. It is stressed in the document that rapid setting of the material immediately after foam formation is crucial to prevent a collapse of the foam. Due to this disclosure, process robustness and product reliability are considered poor.

Bean et al. (U.S. Pat. No. 5,605,570) disclose a procedure to foam finely ground calcium-rich glassy slag by blowing a slurry under decomposition of sodium peroxide. A foam product is obtained solely as a result of fast viscosity increase and rapid setting. In a comparative example, the use of surfactants that are usually admixed to improve foam formation turned out to substantially prolong setting and to result in a product of unsatisfactory mechanical properties. Due to this disclosure, the process does not allow tailoring the foam microstructure that defines the material properties. Brothers et al. (US 2002/0050231) report on foaming a surfactant containing calcium aluminate cement formulation by injection of gas in the piping system through which the cement is placed. The document discloses end product porosities of up to 66 vol %. For insulation applications, the material performance increases with porosity. Pore volume fractions above 70 vol % are therefore favorable. No information is given regarding the pore structure, possibilities to control the pore structure and about the homogeneity of the foam.

Jezequel et al. (WO2011/101386) describe a foamed concrete with density of 200 to 800 kg/m$^3$ and its manufacture by first preparing a concrete slurry which is passed in a second step through a dynamic mixer that is used to disperse a certain fraction of air in the slurry. Although suitable, the method requires a slurry with precisely defined rheology. Further, the method is neither suitable for systems exhibiting high solids loadings and therefore increased viscosity nor for formulations containing relatively coarse aggregates.

Gartner et al (WO2013/034567) describe surfactant modified particles and their use in manufacturing stable cement-containing foams. A broad range of particles is suggested, limestone being specifically named, while very specific bifunctional surfactants are named. The document suggests that these modified particles can be employed in reduced amounts.

Selinger et al (FR2986790) describe foamed silicates used as a mortar. Disclosed therein is the use of surfactants, rather than short chain amphiphilic molecules, as an additive to obtain foamed mortars. The document fails in disclosing a ready-to-use additive composition comprising particles modified with amphiphilic molecules.

Aberle (WO2014/009299) describes a powder mixture and process to make dry mortar. The document addresses the aim of hydrophobizing and thickening cementitious mortars to optimize their properties for use in humid environments.

The prior art shows the need of foamed construction materials and methods of manufacturing the same. The prior art particularly shows the drawbacks of current methods.

Thus, an object of the present invention is to mitigate at least some of these drawbacks of the prior art. Accordingly, the invention provides for a more effective foam formation and stabilization technology. Specifically, there is a need for an easy to implement and effective foam stabilization technology that allows reliable foam formation from various minerals and especially from building material formulations. In particular, it is an aim of the present invention to increase process robustness and product reliability and to enable foam formation from mineral mixes that do not exhibit rapid setting.

These objectives are achieved by the compositions as defined in claim 1 and the methods as defined in claim 6. Further aspects of the invention are disclosed in the specification and independent claims, preferred embodiments are disclosed in the specification and the dependent claims.

The present invention will be described in more detail below. It is understood that the various embodiments, preferences and ranges as provided/disclosed in this specification may be combined at will. Further, depending on the specific embodiment, selected definitions, embodiments or ranges may not apply.

Unless otherwise stated, the following definitions shall apply in this specification:

As used herein, the term "a", "an", "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense.

As used herein, percentages (%) are by weight, unless indicated otherwise or clear from the context.

The present invention will be better understood by reference to the figures.

In more general terms, in a first aspect, the invention relates to a solid particulate composition comprising hydrophobized particles (1) and catalytically active particles (2), whereby said hydrophobized particles (1) are as defined below and are hydrophobized with amphiphilic molecules as defined below and whereby said catalytically active particles (2) are as defined below. The inventive composition may comprise further constituents, particularly pH modifiers (3) and additives (4). These compositions are suitable for manufacturing stable foams with defined and reproducible properties when admixed to suitable starting material before blowing agent is injected. Accordingly, the inventive compositions (i.c.) may be added to suitable starting material (s.m.) to obtain a foamed construction material (f.c.m.); the inventive compositions themselves are no building materials and hence they do not result in a foamed construction material after addition of a blowing agent. Thus, the inventive composition is applied as an additive. This aspect of the invention shall be explained in further detail below:

The present invention provides for catalytically active, inorganic powder compositions. These compositions are particularly designed to enable the reproducible formation of foam when applied with a building material, a refractory, a ceramic or another particulate formulation that is dispersed in a liquid and subsequently foamed by decomposition of a blowing agent. The foam formation powder may be used as an inorganic additive comprising of two main components (1), (2) plus optional pH modifiers (3) plus additives (4). Component (1) are surface modified particles that mainly define foam rheology, stability and pore size. Component (2) is a catalyst that promotes the decomposition of blowing agent and defines the velocity of gas release in the system to be foamed (such as the staring materials as outlined in FIG. 2). Optional components (3), (4) may be added to further regulate the viscosity or the pH of the formulation to be foamed as well as the setting time of hydraulic materials.

The advantages of this composition are that this ready-to-use foam formation powder is applied as single component to the starting material to be foamed. It defines all the relevant properties of a foam, except for the porosity which is given by the amount of blowing agent used, provided that the system is capable of stabilizing the gas.

The inventive composition therefore greatly simplifies the production of foam in laboratories, industrial fabrication sites and especially for on-site application. In addition, its use typically leads to very low concentrations of organics in the foamed end product. This is important for foamed products with target application in the area of fire protection and fire proofing.

The ease of handling guarantees reproducible foam formation which is of special importance when building materials are foamed and there is typically too little time to implement complex admixing procedures. Because the foam formation powder is a dry, homogeneous substance, it exhibits long shelf life. Application of the inventive compositions assures reliable foam formation and excellent foam stability. Foams that are prepared using this inventive composition exhibit homogeneous microstructures throughout the whole volume. This is the key to high product quality and reliability. The inventive compositions may therefore also be considered as a functional additive; this functional additive is a ready-to-use product, e.g. at a construction site.

Solid Particulate Composition:

In one embodiment, the inventive composition is in the form of a powder, particularly a ready-to use powder. This is beneficial, as it allows direct use with common equipment and handling steps known in industry.

In one alternative embodiment, the inventive composition is in the form of granules. Such granules also allow direct use with common equipment and handling steps known in industry.

The inventive compositions are dry, and as a result thereof, the compositions have a low tendency to agglomerate; further, they are free-flowing and/or pourable.

Hydrophobized Particles (1):

The term hydrophobized particles is known in the field and specifically relates to a solid material in particulate form (as defined below) where the particle's surface is modified with amphiphilic molecules (as defined below). Such modification aims to reduce the hydrophilic properties of the particles.

Particles (1.1):

The nature of the particles present will depend on the intended end use of the foam to be formed and particularly includes inorganic materials.

Accordingly, the term includes the following exemplary inorganic materials:

Oxides, including pure and mixed metal oxides (particularly aluminum oxide, silicon dioxide, spinels, cerium-gadoliniumoxide, zirconium oxide, magnesium oxide, tin oxide, titanium oxide and cerium oxide);

Hydroxides (particularly aluminum hydroxide, calcium hydroxide, magnesium hydroxide, very particularly aluminum hydroxide);

Carbides (particularly silicon carbide, boron carbide);

Nitrides (particularly silicon nitride, boron nitride);

Phosphates (particularly calcium phosphates, such as tri-calciumphosphate, hydroxyapatite);

Carbonates (particularly nickel carbonate, calcium carbonate (ground limestone or precipitated calcium carbonate), magnesium carbonate);

Silicates (particularly silicon dioxide, silica fume, fly ash, quartz, ground glasses, slag, calcium silicates, mullite, cordierite, clay minerals like kaolin or bentonite, zirconium silicate, zeolites, diatomaceous earth, very particularly silica fume, clay minerals, zirconium silicate; specifically clay minerals);

Sulfates (particularly calcium sulfate).

In a further embodiment, the term includes oxides, including pure and mixed metal oxides, selected from the group consisting of aluminum oxides (including Al—Mg spinels), silicon dioxides, zirconium dioxides, and zinc oxides, particularly aluminum oxide, silicon dioxide, and zirconium dioxide.

Such inorganic materials may be synthetic materials or naturally occurring minerals. Multi-component compositions comprising mixtures of two or more of the above mentioned compounds of the same or different kind may also be used.

It was found that a careful selection of the inorganic material improves performance and properties of the foamed construction material.

It is beneficial to select the inorganic material in a way that its surface chemistry differs from the surface chemistry of the starting material under the conditions prevailing in the dispersion. By doing so, the amphiphilic molecule (1.2) may be selected to selectively adsorb on the inorganic particle (1.1), not on the starting material (s.m., FIG. 2). As a result, curing and strength development of the construction material are not affected by the described surface modification. Apparently, this consideration is important for construction materials that harden, such as cements.

For materials that do not harden or re-crystallize ("mineral materials"), such as alumina, zirconia, zirconium silicate, silica, other considerations are more important. By selecting the combinations disclosed herein, the dispersions (FIG. 2) may be manufactured more easily.

Specifically, it was found that coagulation does not occur, or at least to a lesser extent, when using the inventive compositions (i.c.)

A particularly preferred inorganic material is calcium carbonate, either synthetic CaCO3 or naturally occurring lime stone. In light of the above discussion, calcium carbonate is particularly suitable for starting materials from the class of calcium sulfate, calcium silicate cement, alumino silicate geopolymer, blast furnace slag, calcium sulfoaluminate cement, hydroxyapatite, beta-tricalciumphosphate.

A further particularly preferred inorganic material is the group of silicates, including particularly silica and clay. In light of the above discussion, silicates are particularly suitable for starting materials from the class of alumina, calcium aluminate, alumino silicate, silica, zirconium silicate, hydroxyapatite, beta-tricalciumphosphate.

A further particularly preferred inorganic material is the group of oxides, such as alumina and zirconia. In light of the above discussion, these oxides are particularly suitable for starting materials from the class of alumina, calcium aluminate cement, alumino silicate, zirconia, zirconium silicate, phosphate cements, calcium phosphate cement, aluminium phosphate binders, zirconia toughened alumina, hydroxy-apatite, beta-tricalciumphosphate.

It was found that the morphology of the particles is of less importance. The invention encompasses dense particles, porous particles or mixtures of dense and porous particles.

It has been found that particles with much different shapes can be used, i.e. particles that are spherical, polygonal plates, needles, fibers, rods, cigars, single crystals etc., provided that their particle size is within suitable dimensions. The invention encompasses foam formation powder being in the form of primary particles or in the form of powder compacts, like granules or pellets. The mean particle size can be measured with a device as it is commonly used in powder technology, such as by sieving or laser diffraction. For powders (primary particles), suitable particle sizes range from 30 nm to 300 µm, more preferably from 100 nm to 250 µm, even more preferably from 100 nm to 150 µm, even more preferably from 100 nm to 100 µm. In a further embodiment, suitable particle sizes range from 100 nm to 10 µm, preferably 100 nm to 2 µm. It was found that the particle size distribution is of less importance. Good foams can be obtained with narrow as well as with broad particle size distributions. For granules or pellets, a suitable size range is from 0.5-20 mm, preferably from 1-10 mm.

Amphiphilic Molecules (1.2):

The term amphiphilic molecules is known in the field and relates to organic compounds having an apolar part (also identified as tail or group R) and a polar part (also identified as head group). Accordingly, suitable amphiphilic molecules contain a tail coupled to a head group, typically by covalent bonds. Such amphiphilic molecules typically contain one tail and one head group, but may also contain more than one head group. The tail can be aliphatic (linear or branched) or cyclic (alicyclic or aromatic) and can carry substituents. Such substituents are e.g. —CnH2n+1 with n<8, —OH, —NH3, etc. Preferred tails are optionally substituted linear carbon chains of 2 to 8 carbon atoms.

It was surprisingly found, that such comparatively small molecules (1.2) have a significant effect on hydrophobization of the particles (1.1) and in combination with the particles (1.1) on foam stability.

The head groups that are coupled to the tail preferably are ionic groups. Examples of possible head groups are specified in Table 1 below (wherein the tail is designated as R) and corresponding salts.

TABLE 1

| | |
|---|---|
| phosphates<br>X: H, CnH2n + 1 (n < 7),<br>alkali metals | $HO-\overset{\overset{O}{\|}}{\underset{\underset{OX}{\|}}{P}}-OR$ |
| phosphonates<br>X: H, CnH2n + 1 (n < 7),<br>alkali metals | $HO-\overset{\overset{O}{\|}}{\underset{\underset{OX}{\|}}{P}}-R$ |
| sulfates | $HO-\overset{\overset{O}{\|}}{\underset{\underset{O}{\|}}{S}}-OR$ |
| sulfonates | $HO-\overset{\overset{O}{\|}}{\underset{\underset{O}{\|}}{S}}-R$ |

TABLE 1-continued

| | |
|---|---|
| alcohols | R—OH |
| amines X: H, $C_nH_{2n+1}$ (n < 7) | X—N(X)(R)—H |
| amides | R—C(=O)—NH$_3$ |
| pyrrolidines | (pyrrolidine with R on N-adjacent carbon, NH) |
| gallates | R—C(=O)—C$_6$H$_2$(OH)$_3$ |
| carboxylic acids | R—C(=O)—OH |

Preferred head groups are selected from carboxylic acids, gallates, amines and sulfonates.

Particularly preferred head groups are selected from carboxylic acids, gallates and amines where X preferably represents H or methyl.

In an advantageous embodiment, amphiphilc molecules reduce the surface tension of an air-water interface to values lower than or equal to 65 mN/m for concentrations lower than or equal to 0.5 mol/l.

In an advantageous embodiment, amphiphilic molecules have a critical micelle concentration (CMC) higher than 10 μmol/l and/or they have a solubility higher than 1 μmol/l.

catalytically active particles (2):

A broad range of catalytically active materials may be used. Suitable catalysts include compounds that react with a blowing agent to form a gas. The choice of catalyst depends on the blowing agent used.

In case peroxides are used as blowing agents, the catalyst (2) is selected from peroxide-decomposing agents. Such agents include iron containing compounds (particularly Hematite ($Fe_2O_3$), Goethite (FeO(OH)), Siderite ($FeCO_3$), Magnetite ($Fe_3O_4$), iron sulfate, Ilmenite ($FeTiO_3$), very particularly Hematite, Goethite, Siderite);

chromates (particularly barium chromates);

oxides (particularly Pyrolusite ($MnO_2$), Cuprite ($Cu_2O$), Magnesite ($MgCO_3$), Bauxite ($Al_2O_3$), Anatase ($TiO_2$), $HfO_2$, Zirconia ($ZrO_2$), transitional aluminum oxides like gamma-alumina or high alumina binders like alphabond; very particularly Pyrolusite);

manganite (MnO(OH));

calcium hypochlorite;

manganese salts (particularly $KMnO_4$, $MnSO_4$, $C_4H_6MnO_4$; very particularly potassium permanganate);

potassium iodide;

catalase;

silicates (particularly Willemite ($Zn_2SiO_4$));

$P_2O_5$.

A particularly preferred catalyst is mangan (IV) oxide, either synthetic $MnO_2$ or naturally occurring minerals such as Pyrolusite.

Due to their different function, particles (2) and (1.1) differ. While particles (1.1) are modified with amphiphilic molecules (1.2) to stabilize gas bubbles, particles (2) are non-modified to enable their catalytic properties.

pH Modifiers (3):

A broad range of known modifiers may be used, including acids, bases and buffer systems. The choice of pH modifier depends on the intended use; suitable pH modifiers may be selected from the group of hydroxides (particularly NaOH, KOH);

inorganic acids (particularly HCl, $HNO_3$);

fruit acids (particularly citric acid, tartaric acid);

phosphates.

The above pH modifiers are known and commercially available or obtainable according to known methods.

Additives (4):

A broad range of additives, known in the field, may be used. Additives include accelerators and retarders to setting reactions of hydratable materials. Examples for accelerators of the hydratisation reaction include calcium salts (such as calcium chloride and calciumnitride), lithiumsalts and lithiumhydroxide, Triethanolamin, Sigunit. Examples for retarders of the hydratisation reaction include citric acid, cellulose, Retardan, sugars, tartaric acid and its salts.

Additives further include dispersing aids, for example polycarboxy ethers, citric acid, ViscoCrete, melamine sulfonate, naphthalene sulfonate and lignin sulfonates.

Additives further include rheology modifiers, for example cellulose and cellulose derivatives, polyvinyl alcohol, polyethylene imine, polyethylene oxide, polyethylene glycol, xanthan gum, bentonite, microsilica, fine calcium carbonates.

The above additives are known and commercially available or obtainable according to known methods.

Amounts:

The amount of constituents (1) . . . (4) in the inventive particulate composition may vary over a broad range and particularly depends on the intended use and the specific constituents chosen. Suitable amounts may be determined by routine experiments.

In an advantageous embodiment, the invention relates to a composition wherein the amount of (1) is in the range of at least 20%, preferably at least 40%, most preferably at least 60% of the total particulate composition.

In a further advantageous embodiment, the invention relates to a composition wherein the amount of (2) is in the range of 0.2-80%, preferably 0.2-60%, most preferably 0.2-40% to the total particulate composition. This range is broad, as the amount of catalyst depends on the amount of blowing agent used. In case of high porosity desired and less stability required, the amount of catalyst increases. Also, density of catalyst (2) and density of particle (1) may vary by factor of 2, also broadening the range. However, identifying an appropriate amount of catalyst (2) is within routine work of the skilled person.

In a further advantageous embodiment, the invention relates to a composition wherein the amount of (3) is in the range of 0-10%, preferably 0-5%) in respect to the total particulate composition.

In a further advantageous embodiment, the invention relates to a composition wherein the amount of (4) is in the range of 0-30%, preferably 0-20%, more preferably 0-10% in respect to the total particulate composition.

In one embodiment, the amount of (1) and (2) sum up to 100%; in a further embodiment, the amount of (1), (2), (3) and (4) sum up to 100%.

The amount of amphiphilic molecules (1.2) on the particles (1.1) may vary over a broad range. A suitable range includes of 0.5-160 µmol (1.2)/m$^2$ particle (1.1), preferably 3-90 µmol (1.2)/m$^2$ particle (1.1), more preferably 5-60 µmol (1.2)/m$^2$ particle (1.1).

The amount of amphiphilic molecules (1.2) on the particles (1.1) may vary over a broad range. A suitable range includes of 0.1-20% (1.2) to particle (1.1), preferably 0.4-12% (1.2) to particle (1.1), more preferably 0.8-7% (1.2) to particle (1.1).

The amount of inventive composition used to foam a certain amount of starting material may vary over a broad range.

Suitable amounts are in the range of 0.2-50%, preferably 0.2-30%, more preferably 0.5-20% inventive composition in respect to dry mass of starting material (5).

The inventive particulate composition (i.c.) may exhibit the following beneficial properties:
- It enables foaming of minerals suspensions (s.m.) with a strong tendency to thicken or coagulate upon chemical and/or physical modification.
- It promotes foam formation of mineral slurries that are chemically foamed, particularly controlled foam formation.
- It defines foam stability over the whole process of manufacturing.
- It allows controlling the rate of foam expansion and the foam microstructure.
- It leads to homogeneous and gradient-free foam microstructures.
- It is a ready-to-use mixture the addition of which can be integrated in conventional production processes.
- It does not, or essentially does not, interfere with hydration reactions of construction materials. As a consequence thereof, the onset of setting is not influenced when adding the inventive composition.
- It leads to a low concentration of combustible substances in the end product.
- It is economical and straight-forward to manufacture.
- It is a dry composition that is easy to ship and that exhibits a long shelf life.

In a second aspect, the invention relates to a process for manufacturing a composition as described herein as first aspect of the invention. This aspect of the invention shall be explained in further detail below:

The raw materials, particles (1.1), amphiphilic molecules (1.2) catalytically active particles (2), pH modifiers (3) and additives (4) are commercial items or may be obtained according to known methods.

The catalytically active foam formation powder is prepared by blending particles (1.1), short chain amphiphilic molecules (1.2) and catalytically active particles (2) plus additional additives (3), (4) in a suitable apparatus until a homogeneous mix is achieved. Accordingly, the inventive method comprises the step of combining the raw materials in the appropriate amounts to obtain the solid particulate composition as described herein. The combination of the raw materials may be accomplished by known methods. A suitable method includes supplying the raw materials to a ball mill and milling the materials for a prolonged period of time. A suitable mixing time is from 1-100 hrs, preferably 12-24 hrs.

In an advantageous embodiment, the method is performed dry, i.e. without adding solvents to the reaction system. It comes as a surprise that particles (1.1) are homogeneously and sufficiently hydrophobized simply by mixing them with amphiphilic molecules (1.2). This avoids the use and removal of solvents, making manufacturing simple and reliable.

In a third aspect, the invention relates to the use of compositions as described herein (first aspect) in the manufacturing of foamed construction materials, such as foamed cements. This aspect of the invention shall be explained in further detail below:

As already discussed above, the inventive compositions are suited to generate foams in the presence of a blowing agent. Accordingly, they may be used to generate mineral foams. Such mineral foams may be used as construction material and therefore include mineral foams of cement.

The invention therefore provides for the use of a composition as described herein as ready-to-use product for manufacturing foamed construction materials, particularly foamed cements.

The term blowing agent is known and describes any material that releases a gas, such as oxygen, nitrogen, hydrogen, or carbon dioxide, under appropriate conditions.

Oxygen releasing compounds include carbamide peroxide, sodium percarbonate, peroxo-compounds like peroxo-monosulfuric and -disulfuric acids, chloric and perchloric acid and their salts, alkali or alkali earth peroxides, for example sodium peroxide, related compounds like potassiumperoxo monosulfate and sodiumperoxo disulfate.

Hydrogen releasing compounds include aluminum, for example in the form of a powder, chips, splints or as a paste. In aqueous alkaline environments, such as typically present in cementitious compositions, Al is oxidized to form aluminum hydroxide species and hydrogen. This is summarized in the following simplified reaction scheme: $2Al+6H_2O \rightarrow 2Al(OH)_3+3 H_2$.

Nitrogen releasing compounds include azodicarbonamide and modified azodicarbonamides.

Carbon dioxide releasing compounds include Isocyanates and diisocyanates, alkaline and alkaline earth carbonates, alkaline and alkaline earth hydrogen carbonates, ammonium carbonates, ammonium hydrogen carbonates.

Preferred blowing agents include peroxides, such as hydrogen peroxide.

The foamed construction materials may be tuned to the specific needs of the end user by choosing an appropriate inventive composition.

First, the porosity may be influenced. In the case of foamed cement, porosities up to 98 vol. % may be achieved. Key parameters are the amount of blowing agent and the composition of the catalytically active foam formation powder.

Second, the type of pores may be influenced. Foamed construction materials may show predominantly open-pore structure or predominantly closed-pore structure. Key parameter is the amount and composition of the catalytically active foam formation powder.

Third, pore size distribution may be influenced. Typically, the end use aims for a narrow and homogeneous size distribution. This is an inherent property provided by the inventive composition.

Figure 1:
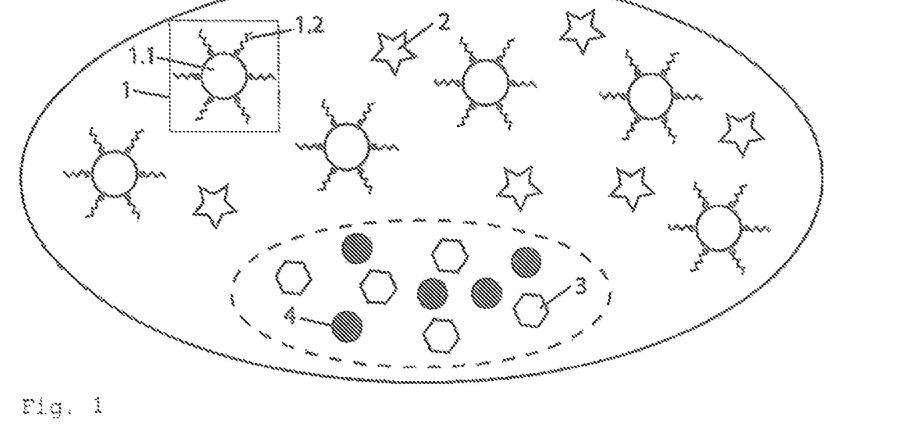
FIG. 1 provides a schematic representation of the inventive solid particulate composition as described in more detail below. The components according to the invention are: hydrophobized particles (1) (comprising the particle (1.1) and the amphiphilic molecules (1.2)), and catalytically active particles (2). Optional components are indicated by the dotted line, pH modifiers (3) and additives (4).
Figure 2:
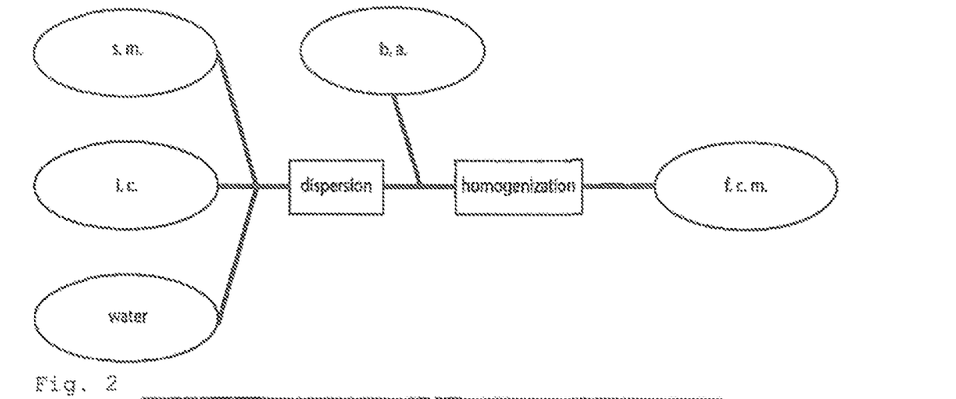
FIG. 2 provides a schematic representation of one possible use of the inventive composition to obtain a foamed construction material. In this figure, i.c. represents the inventive composition, s.m. represents known starting materials, such as a cementitious composition; b.a. represents a blowing agent, such as H2O2; f.c.m. represents foamed construction material, such as foamed cement. As indicated in this schematic representation, a foamed construction material (f.c.m.) is obtained, if the inventive composition (i.c.) is combined as an additive to the starting material (s.m.) and water, which results in a dispersion to which blowing agent (b.a.) is than added.
Figure 3:
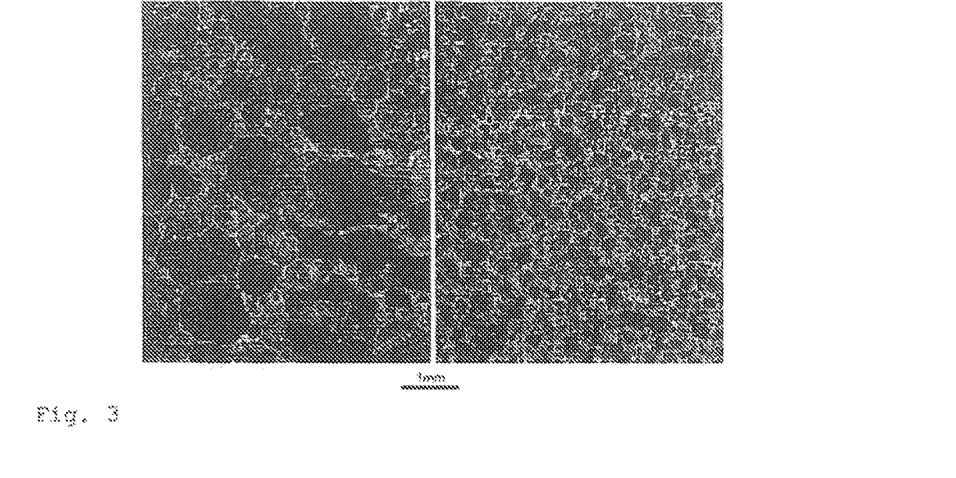
FIG. 3 provides light microscope images of the materials as outlined in the examples 1.1 (left) and 1.2 (right).
Figure 4:
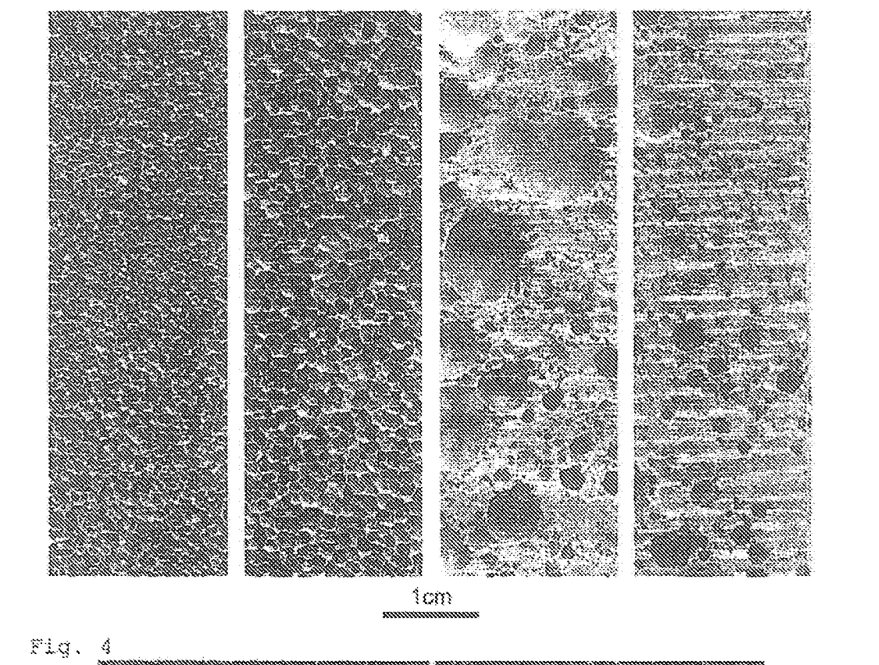
FIG. 4 provides photographs of the construction materials as outlined in the examples 2.1, 2.2, 2.4 and 2.5 (from left to right).
Figure 5:
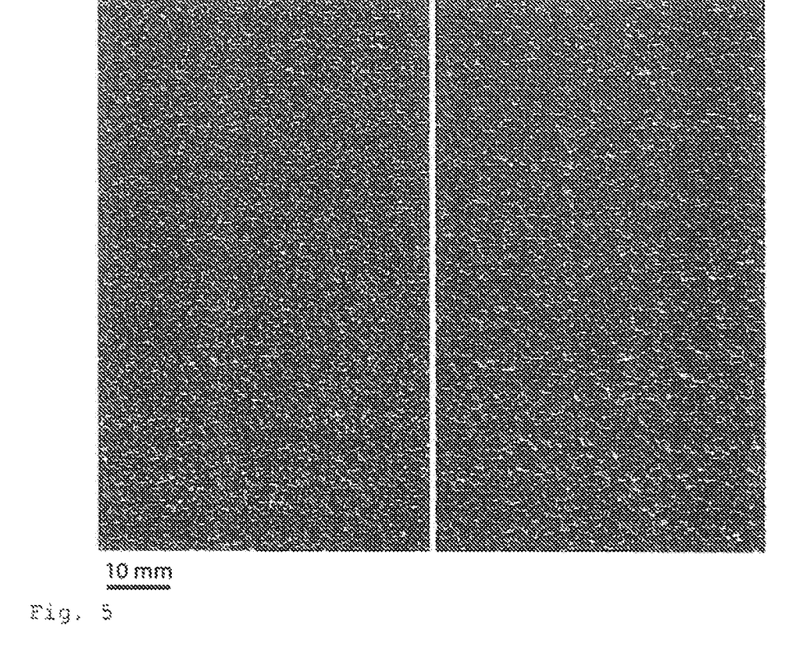
FIG. 5 is an enlarged photograph of FIG. 4, examples 2.1 and 2.2.

In a forth aspect, the invention relates to a process for manufacturing foamed construction materials (f.c.m.) using the compositions described in the first aspect of the invention (i.c.). This aspect shall be explained in further detail below and is also outlined in FIG. 2:

The above discussed drawbacks of the prior art are overcome applying the inventive ready-to-use product (i.c.). It simplifies the process involved in foaming to the steps of admixing a defined amount of the inventive composition to the starting material to be foamed (s.m.). The addition may be carried out before, while or after dispersion of the starting material. In a final step, a suitable blowing agent (b.a.) is injected to initiate foaming.

The inventive compositions are therefore compatible with existing equipment and may be directly applied without further education of the involved construction worker.

Thanks to the foam stability obtained when using the inventive composition, a wide variety of starting materials may be used. There is no limitation to systems with short onset of setting. Rather, any natural occurring onset of setting of the starting materials matches with the inventive compositions.

Contrary to known foaming products, the inventive ready-to use product does not prolong the onset of setting. This minimizes any loss in strength and durability of the foamed product.

In consequence, a process for manufacturing foamed construction materials is provided that has (a) an increased process robustness and (b) improved product quality and reliability, compared to known methods.

To further illustrate the invention, the following examples are provided. These examples are provided with no intent to limit the scope of the invention.

EXAMPLE 1: CALCIUM ALUMINATE FOAM

Example 1.1: With Closed Pore Structure

Solid Particulate Composition (Ready-to-Use Product):
The weight fractions of the constituents are as follows.
97.56% Microsilica
1.33% Heptylamine
1.02% Manganese Oxide Microsilica, Heptylamine and manganese oxide are filled in a 500 mL low density polyethylene milling bottle containing 230 g 15 mm diameter alumina milling balls and milled for 18 h. Thereafter, the homogenized powder is poured to a beaker. The milling balls are retained and cleaned from remains by a polymer sieve.

Foam Preparation:
A calcium aluminate foam is prepared from the following composition of raw materials given in weight fractions.
65.23% Calcium Aluminate Powder
38.88% Water
3.75% Foam Formation Powder
0.11% Lithium Carbonate
1.04% Hydrogen Peroxide (50% solution)

The foam formation powder is given to a beaker containing the water and homogenized by vigorously stirring the suspension. Then, the suspension is cooled to 5° C., the calcium aluminate powder is added and the suspension is again stirred until homogeneity is achieved. Subsequently, the lithium carbonate is admixed. After 2 min of stirring, the foaming of the suspension is initiated by adding the hydrogen peroxide. The so obtained slurry is poured to a mold where the foam expansion evolves until the decomposition of the hydrogen peroxide is completed. The prepared wet foam is stable until after 42 min the cement setting reaction takes place and the foam is solidified. The calcium aluminate foam is stored in humid atmosphere for 2 days to allow proper setting. Thereafter, it is demolded and dried.

Results:
The resulting calcium aluminate foam part exhibits a diameter of 120 mm and a height of 60 mm. Its density is 336 kg/m3. This is considered an unusual low density for calcium aluminate foams. The median pore size is 0.72 mm with a 10% quantile of 0.21 mm and a 90% quantile of 1.48 mm. The foam exhibits mainly closed pores.

Example 1.2: With Open Pore Structure

Solid Particulate Composition (Ready-to-Use Product):
The weight fractions of the constituents are as follows.
97.47% Alumina Powder (CT3000SG)
1.33% Propyl Gallate
1.02% Manganese Oxide Alumina powder, propyl gallate and manganese oxide are filled in a 500 mL low density polyethylene milling bottle containing 305 g 15 mm diameter alumina milling balls and milled for 18 h. Thereafter, the homogenized powder is poured to a beaker. The milling balls are retained and cleaned from remains by a polymer sieve.

Foam Preparation:
A calcium aluminate foam is prepared from the following composition of raw materials given in weight fractions.
54.48% Calcium Aluminate Powder
37.43% Water
6.49% Foam Formation Powder
0.60% Lithium Carbonate
1.00% Hydrogen Peroxide (50% solution)

The foam formation powder is given to a beaker containing the water with a NaOH concentration of 15.25 mMol/L. Foaming powder and water are homogenized by vigorously stirring the suspension. Then, the suspension is cooled to 5° C., the calcium aluminate powder is added and the suspension is again stirred until homogeneity is achieved. Subsequently, the lithium carbonate is admixed. After 2 min of stirring, the foaming of the suspension is initiated by adding the hydrogen peroxide. The so obtained slurry is poured to a mold where the foam expansion evolves until the decomposition of the hydrogen peroxide is completed. The prepared wet foam is stable until after 50 min the cement setting reaction takes place and the foam is solidified. The calcium aluminate foam is stored in humid atmosphere for 2 days to allow proper setting. Thereafter, it is demolded and dried.

Results:
The resulting calcium aluminate foam part exhibits a diameter of 120 mm and a height of 55 mm. Its density is 367 kg/m3. This is considered an unusual low density for Calcium aluminate foams. The median pore size is 0.26 mm with a 10% quantile of 0.12 mm and a 90% quantile of 0.52 mm. The foam shows an open pore structure.

The following table summarizes the results obtained.

|  | Ex. 1.1 | Ex. 1.2 |
|---|---|---|
| Starting Material | Calcium Aluminate Cement | Calcium Aluminate Cement |
| Sample Size (mm) | cylindrical, 120 × 60 | cylindrical, 120 × 55 |
| Microstructure | homogeneous, closed pores | homogeneous, open pores |

-continued

|  | Ex. 1.1 | Ex. 1.2 |
|---|---|---|
| Density (kg/m³) | 336 | 367 |
| $d_{10}$ (mm) | 0.21 | 0.12 |
| $d_{50}$ (mm) | 0.72 | 0.26 |
| $d_{90}$ (mm) | 1.48 | 0.52 |
| Setting Onset (h) | 0.70 | 0.83 |

$d_{10}$, $d_{50}$, and $d_{90}$ represent the 10, 50 and 90% quantiles of the pore size distribution, respectively

EXAMPLE 2: PORTLAND CEMENT FOAM (W/Z 0.55)

Example 2.1: With Small Pores

Solid Particulate Composition (Ready-to-Use Product):
The weight fractions of the constituents are as follows.
82.447% Calcium Carbonate;
13.592% Manganese Oxide;
3.960% Heptanoic Acid
All constituents are filled in a 500 mL low density polyethylene milling bottle containing 250 g 15 mm diameter alumina milling balls and milled for 18 h. Thereafter, the homogenized powder is poured to a beaker. The milling balls are retained and cleaned from remains by a polymer sieve.

Foam Preparation:
A cement foam (CEM I, 52.5) is prepared from the following composition of raw materials given in weight fractions.
58.859% Cement;
32.427% Water;
6.433% Foam Formation Powder;
2.280% Hydrogen Peroxide (50% solution)
The foam formation powder is given to a beaker containing the water and homogenized by vigorously stirring the suspension. Then, this suspension is added to the cement powder while stirring. After 10 min of stirring, the foaming of the suspension is initiated by adding the hydrogen peroxide. The so obtained slurry is poured to a mold where the foam expansion evolves until the decomposition of the hydrogen peroxide is completed. The cement foam is demolded after 4 days and subsequently dried.

Results:
The prepared wet foam is stable. The setting on-set happens 2.40 h after addition of the water to the cement powder. The resulting cement foam part features dimensions of 200 mm×200 mm×50 mm. Its density is 173 kg/m3. This is considered a very low density for Portland cement foams. The pore structure is homogeneous without gradients. The median pore size is 0.82 mm with a 10% quantile of 0.34 mm and a 90% quantile of 1.35 mm.

Example 2.2: With Large Pores

Solid Particulate Composition (Ready-to-Use Product):
The weight fractions of the constituents are as in example 2.1
All constituents are filled in a 500 mL low density polyethylene milling bottle containing 250 g 15 mm diameter alumina milling balls and milled for 18 h. Thereafter, the homogenized powder is poured to a beaker. The milling balls are retained and cleaned from remains by a polymer sieve.

Foam Preparation:
A cement foam (CEM I, 52.5) is prepared from the following composition of raw materials given in weight fractions.
60.628% Cement;
33.391% Water;
3.683% Foam Formation Powder;
2.299% Hydrogen Peroxide (50% solution)
The foam formation powder is given to a beaker containing the water and homogenized by vigorously stirring the suspension. Then, this suspension is added to the cement powder while stirring. After 10 min of stirring, the foaming of the suspension is initiated by adding the hydrogen peroxide. The so obtained slurry is poured to a mold where the foam expansion evolves until the decomposition of the hydrogen peroxide is completed. The cement foam is demolded after 4 days and subsequently dried.

Results:
The prepared wet foam is stable. The setting on-set happens 2.74 h after addition of the water to the cement powder. The resulting cement foam part features dimensions of 200 mm×200 mm×50 mm. Its density is 174 kg/m3. This is considered a very low density for Portland cement foams. The pore structure is homogeneous without gradients. The median pore size is 1.64 mm with a 10% quantile of 0.45 mm and a 90% quantile of 2.57 mm.

Example 2.3: Foam Stability

Solid Particulate Composition (Ready-to-Use Product):
The weight fractions of the constituents for the catalytically active foam formation powder are as follows.
82.447% Calcium Carbonate;
13.592% Manganese Oxide;
3.960% Heptanoic Acid
All constituents are filled in a 500 mL low density polyethylene milling bottle containing 250 g 15 mm diameter alumina milling balls and milled for 18 h. Thereafter, the homogenized powder is poured to a beaker. The milling balls are retained and cleaned from remains by a polymer sieve.

Foam Preparation:
A cement foam (CEM I, 52.5) is prepared from the following composition of raw materials given in weight fractions. To monitor foam stability over time, the setting reaction is retarded using Mapei Mapetard D.
58.769% Cement;
31.356% Water;
1.175% Retarder
6.423% Foam Formation Powder;
2.277% Hydrogen Peroxide (50% solution)
The foam formation powder is given to a beaker containing the water and homogenized by vigorously stirring the suspension. Then, this suspension is added to the cement powder while stirring. After 10 min of stirring, the foaming of the suspension is initiated by adding the hydrogen peroxide. The so obtained slurry is poured to a transparent cylindrical mold (12 cm diameter and 30 cm height) and filled entirely with foam. The foam stability is monitored over time by taking pictures of the sample every 2 minutes.

Results:
The prepared wet foam was still soft 7 h after addition of water to the cement. During this time, the foam did not experience changes in its microstructure (pore size distribution, density), no gradients were formed and the change in foam height was less than 5%.

Example 2.4: Using Foam Formation Powder without Amphiphilic Molecules (Comparative Example, not According to the Invention)

Solid Particulate Composition (Devoid of Amphiphilic molecules (1.2)):
The weight fractions of the constituents are as follows.
85.847% Calcium Carbonate;
14.153% Manganese Oxide;
All constituents are filled in a 500 mL low density polyethylene milling bottle containing 250 g 15 mm diameter alumina milling balls and milled for 18 h. Thereafter, the homogenized powder is poured to a beaker. The milling balls are retained and cleaned from remains by a polymer sieve.

Foam Preparation:
A cement foam (CEM I, 52.5) is prepared from the following composition of raw materials given in weight fractions.
60.476% Cement;
33.307% Water;
3.924% Foam Formation Powder;
2.293% Hydrogen Peroxide (50% solution)
The foam formation powder is given to a beaker containing the water and homogenized by vigorously stirring the suspension. Then, this suspension is added to the cement powder while stirring. After 10 min of stirring, the foaming of the suspension is initiated by adding the hydrogen peroxide. The so obtained slurry is poured to a mold where the foam expansion evolves until the decomposition of the hydrogen peroxide is completed. The cement foam is demolded after 4 days and subsequently dried.

Results:
The prepared wet foam is unstable and disintegrates already during foaming. The setting on-set happens 2.74 h after addition of the water to the cement powder. The resulting cement foam part features dimensions of 200 mm×200 mm×25 mm. Its density is 690 kg/m3. The pore structure is highly inhomogeneous with very large and also fine pores and with gradients.

Example 2.5: Without Hydrophobized Particles (Comparative Example, not According to the Invention)

Foam Preparation:
A cement foam (CEM I, 52.5) is prepared from the following composition of raw materials given in weight fractions.
62.418% Cement;
34.376% Water;
0.888% Manganese Oxide;
2.317% Hydrogen Peroxide (50% solution)
The manganese oxide is given to a beaker containing the water and homogenized by vigorously stirring the suspension. Then, this suspension is added to the cement powder while stirring. After 10 min of stirring, the foaming of the suspension is initiated by adding the hydrogen peroxide. The so obtained slurry is poured to a mold where the foam expansion evolves until the decomposition of the hydrogen peroxide is completed. The cement foam is demolded after 4 days and subsequently dried.

Results:
The prepared wet foam is unstable and disintegrates already during foaming. The setting on-set happens 3.06 h after addition of the water to the cement powder. The resulting cement foam part features dimensions of 200 mm×200 mm×20 mm. Its density is 804 kg/m3. The pore structure is highly inhomogeneous with very large and also fine pores and with gradients.

CONCLUSIONS

The following table summarizes the results obtained, in all cases starting material=Portland cement; sample size (mm)=rectangular, 200×200×50:

|  | Ex. 2.1 | Ex. 2.2 | Ex. 2.4 | Ex. 2.5 |
| --- | --- | --- | --- | --- |
| Microstructure | homogeneous, closed pores | homogeneous, closed pores | inhomogeneous gradients | inhomogeneous gradients |
| Density (kg/m$^3$) | 173 | 174 | 690 | 804 |
| $d_{10}$ (mm) | 0.34 | 0.45 | — | — |
| $d_{50}$ (mm) | 0.82 | 1.64 | — | — |
| $d_{90}$ (mm) | 1.35 | 2.57 | — | — |
| Setting Onset | 2.40 h | 2.74 h | 2.74 h | 3.06 h |

$d_{10}$, $d_{50}$, and $d_{90}$ represent the 10, 50 and 90% quantiles of the pore size distribution, respectively When considering example 2, and comparing the individually performed experiments 2.1, 2.2, 2.3, 2.4 and 2.5, the following may be concluded:

@2.1: By using 10.93 wt % inventive composition (based on dry materials) a foam with fine pores is obtained.

@2.2: By using only 6.07 wt % (rather than 10.93 wt %, i.e ½ of (1)) a homogeneous foam with significantly increased pore size is obtained. Reducing the amount of inventive composition does neither influence onset of setting nor density of the final component.

@2.3: By using inventive composition, cement foams are prepared which are stable for more than 7 h. As a result, foams with highly controlled microstructures and properties are achieved and no fast setting is necessary for their production.

@2.4: By omitting the amphihiphlic molecules (1.2), no stable foam is obtained. Further, density is higher and pore structure is less homogeneous. Onset of setting is not, or not significantly, influenced.

@2.5: By omitting the hydrophobized particles (1), no stable foam is obtained. Further, density is even higher and pore structure is less homogeneous. Onset of setting is not, or not significantly, influenced.

Overall conclusion: Amphiphilic molecules (1.2) in combination with particles (1.1) are of core importance for obtaining stable foams with controlled microstructures. Amphiphilic molecules (1.2) in combination with particles (1.1) do not affect onset of setting.

The invention claimed is:
1. A dried mineral foam comprising from 0.5 to 20 weight percent of a functional additive for mineral foam formation, based on dry mass of starting material, wherein the functional additive comprises
  a first group of particles (1) and a second group of particles (2), whereby said first group of particles (1)
    are selected from the group consisting of Oxides, Hydroxides, Carbides, Nitrides, Phosphates, Carbonates, and Silicates (1.1), and
    where the particles surface is modified with amphiphilic molecules (1.2) that comprise at least one head group and one tail group,
    said tail group being selected from an aliphatic group with 2 to 8 carbon atoms, and said head group being selected from phosphates, phosphonates, sulfates, sulfonates, alcohols, amines, amides, pyrrolidones, gallates, and carboxylic acids; and said second group of particles (2)
are catalytically active particles adapted to react with a blowing agent to form a gas,
are selected from the group consisting of synthetic and natural Mn(IV) oxides;

the ratio (1): (2) is 20:80 to 99.8:0.2; and the amount of amphiphilic molecules (1.2) on the particles (1.1) is in the range of 0.5-160 μmol (1.2)/m$^2$ particle (1.1).

2. The dried mineral foam of claim 1 comprising a closed cell closed-pore structure.

3. The dried mineral foam of claim 1, further comprising pH modifiers (3) and/or additives (4), whereby
said pH modifiers (3) are selected from the group consisting of acids, bases and mixtures thereof; and
said additives (4) are selected from the group consisting of accelerators, retarders, dispersing aids, and rheology modifiers.

4. The dried mineral foam according to claim 1, wherein said head group being selected from carboxylic acids, gallates and amines.

5. The dried mineral foam according to claim 1, wherein
said synthetic and natural Mn(IV) oxides comprise Pyrolusite.

6. The dried mineral foam according to claim 1 which is foamed cement.

7. The dried mineral foam according to claim 1 wherein the mineral foam is free of random gradients and homogeneous throughout its whole volume, and wherein the mineral foam has a density from 173 to 367 kg/m$^3$ based on the dried mineral foam.

* * * * *